United States Patent
Ozeki

(10) Patent No.: US 10,182,202 B2
(45) Date of Patent: Jan. 15, 2019

(54) DISPLAY APPARATUS WITH PANEL SUPPORTING PORTION AND TELEVISION RECEIVER

(71) Applicant: Sharp Kabushiki Kaisha, Sakai, Osaka (JP)

(72) Inventor: Tsuyoshi Ozeki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 68 days.

(21) Appl. No.: 15/323,126

(22) PCT Filed: Jun. 26, 2015

(86) PCT No.: PCT/JP2015/068569
§ 371 (c)(1),
(2) Date: Dec. 30, 2016

(87) PCT Pub. No.: WO2016/006481
PCT Pub. Date: Jan. 14, 2016

(65) Prior Publication Data
US 2017/0142365 A1   May 18, 2017

(30) Foreign Application Priority Data
Jul. 9, 2014  (JP) ................................. 2014-141760

(51) Int. Cl.
*G02F 1/1341* (2006.01)
*G02F 1/1368* (2006.01)
(Continued)

(52) U.S. Cl.
CPC ........... *H04N 5/64* (2013.01); *G02F 1/13394* (2013.01); *G02F 1/133308* (2013.01);
(Continued)

(58) Field of Classification Search
CPC ...... H04N 5/44; H04N 5/64; B29D 11/00798; G02F 1/133606; G02F 1/133608;
(Continued)

(56) References Cited

U.S. PATENT DOCUMENTS

| | | | |
|---|---|---|---|
| 8,215,784 B2* | 7/2012 | Habara | G02F 1/133608 362/633 |
| 2012/0194760 A1* | 8/2012 | Fukuda | G02F 1/133308 349/58 |

(Continued)

FOREIGN PATENT DOCUMENTS

JP   2013-164466 A   8/2013

*Primary Examiner* — Huyen Ngo
(74) *Attorney, Agent, or Firm* — Keating & Bennett, LLP

(57) ABSTRACT

A display apparatus with a panel supporting portion includes a supporting body that has a plate shape and supports an end edge portion of an optical sheet. The supporting body includes a panel supporting portion in an outside end edge portion. The panel supporting portion supports an end edge portion of the display panel, and has a rib on an inside end edge portion and a fitting portion that fits one position regulating portion of an optical sheet. The rib has a cut-out portion in which a portion of the rib that corresponds to an end of the fitting portion is cut out so that a height is gradually lowered toward the fitting portion. Load application to the display panel on both end portions of the fitting portion is suppressed by the cut-out portion.

6 Claims, 13 Drawing Sheets

(51) Int. Cl.
*H04N 5/64* (2006.01)
*G02F 1/1339* (2006.01)
*H04N 5/44* (2011.01)
*G02F 1/1333* (2006.01)
*G02F 1/1335* (2006.01)

(52) U.S. Cl.
CPC ............ *H04N 5/44* (2013.01); *G02F 1/1341* (2013.01); *G02F 1/1368* (2013.01); *G02F 1/133514* (2013.01); *G02F 1/133528* (2013.01); *G02F 2001/133317* (2013.01)

(58) Field of Classification Search
CPC . G02F 1/13394; G02B 6/0088; G02B 6/0091; H05K 1/142
See application file for complete search history.

(56) References Cited

U.S. PATENT DOCUMENTS

| | | | | |
|---|---|---|---|---|
| 2016/0255749 | A1* | 9/2016 | Isaji | H05K 9/0015 361/752 |
| 2016/0356952 | A1* | 12/2016 | Kawabata | G02B 6/0088 |
| 2017/0146727 | A1* | 5/2017 | Kuroyanagi | G02B 6/0088 |

* cited by examiner

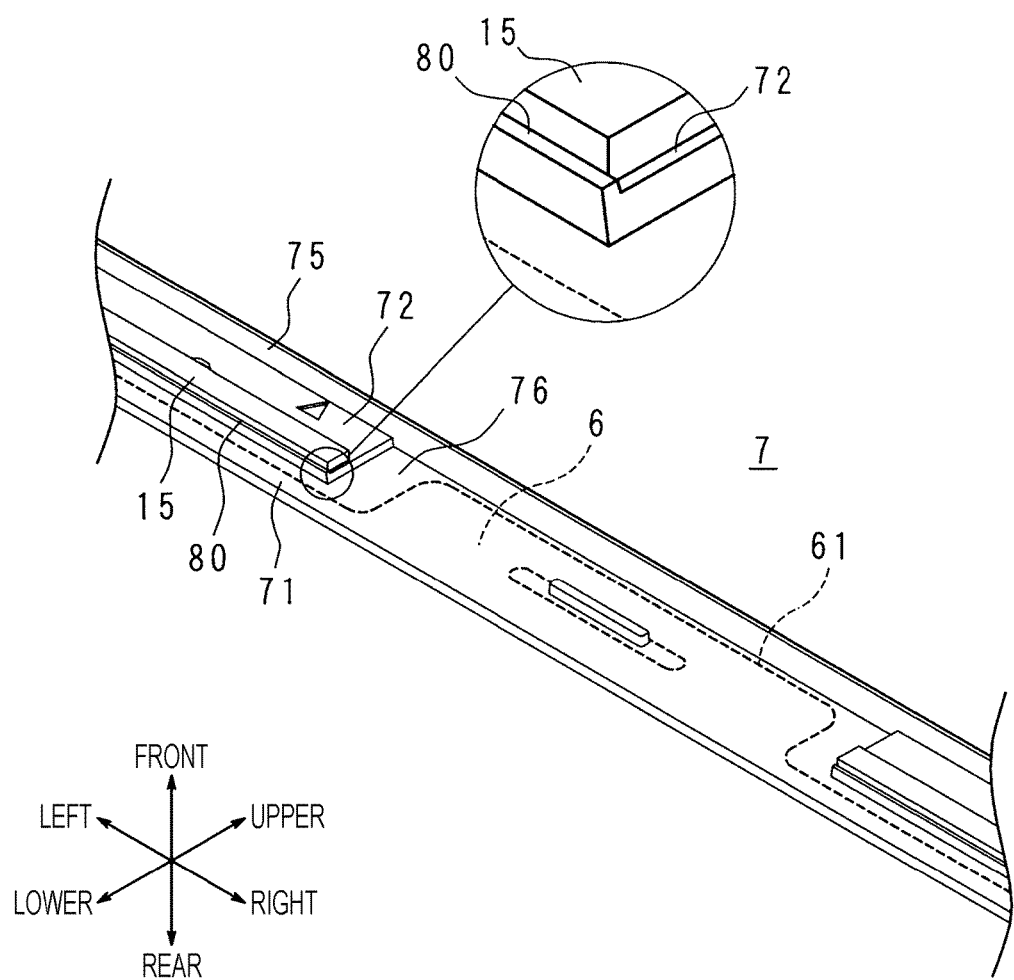

DISPLAY APPARATUS WITH PANEL SUPPORTING PORTION AND TELEVISION RECEIVER

CROSS-REFERENCE TO RELATED APPLICATIONS

This application is the national phase under 35 U. S. C. § 371 of PCT International Application No. PCT/JP2015/068569 which has an International filing date of Jun. 26, 2015 and designated the United States of America.

BACKGROUND

Field

The present invention relates to a display apparatus including a display panel that displays an image on a front side and a supporting body that supports an end edge portion of the display panel, and a television receiver including the display apparatus.

Background Art

For example, a television receiver (hereinafter, referred to as a TV receiver) such as a liquid crystal television receiver includes a display module having a display panel that displays an image on a front side and a backlight unit that irradiates a rear side of the display panel with light, a front cabinet and a rear cabinet that are made of synthetic resin and sandwich front and rear sides of the display module to be housed, and a stand. The display module forms a substantially rectangular parallelepiped shape that is horizontally long as a whole and is housed in the front cabinet and the rear cabinet in a vertical posture.

The display panel has a color filter substrate, a liquid crystal layer, a TFT substrate, and two polarizers. The color filter substrate and the TFT substrate are adhered to each other with a sealing material interposed therebetween, and the liquid crystal layer is injected therebetween.

The backlight unit is disposed on a rear surface side of the display panel. An optical sheet, a light guide plate, and an LED substrate are accommodated in a chassis.

FIG. 12 is a sectional view of a part of a display module of the related art and FIG. 13 is a perspective view of a part of a middle chassis of the related art.

The display module includes a display panel 5, an optical sheet 6, a middle chassis 7, a light guide plate 10, an LED substrate (not illustrated), a heat spreader (not illustrated), and a backlight chassis (hereinafter, referred to as a BL chassis) 14. An end edge portion on an upper side of the optical sheet 6 is provided with a position regulating portion 61 protruding along a surface direction.

An end edge portion of a front surface and a side surface of the display module are covered by a front cabinet 3.

The BL chassis 14 forms a substantially box shape with an opening on a display panel 5 side. The light guide plate 10, a reflection sheet, an LED substrate, and a heat spreader are accommodated in the BL chassis 14.

The middle chassis 7 includes a body 71, a panel supporting portion 72, a rib 80, a buffer material accommodating portion 74, and an abutting portion 75. The body 71 forms a plate shape and the panel supporting portion 72 that forms a plate shape and extends in a longitudinal direction of the body 71 is provided in the end edge portion on the upper side of the body 71. The rib 80 extending in the longitudinal direction of the panel supporting portion 72 is provided in the end edge portion on a lower side of the panel supporting portion 72. The panel supporting portion 72 is cut out at three locations in the longitudinal direction corresponding to the position regulating portion 61 and a fitting portion 76 is provided. The end edge portion on the upper side of the panel supporting portion 72 is provided with the abutting portion 75 so as to be perpendicular to the panel supporting portion 72. The buffer material accommodating portion 74 is recessed on the rear surface of the body 71.

In the middle chassis 7 configured as described above, in a state where the position regulating portion 61 is fitted in the fitting portion 76 of the panel supporting portion 72, an end edge portion of the optical sheet 6 is supported on the front surface of the body 71. In a state where a buffer material 15 is mounted between the rib 80 and the abutting portion 75, an end edge portion on a rear surface of the display panel 5 is supported by the panel supporting portion 72. That is, in a state where a buffer material 18 is interposed between the end edge portion on the front surface of the display panel 5 and the front cabinet 3, and the buffer material 15 is interposed between the end edge portion on the rear surface of the display panel 5 and the panel supporting portion 72, the display panel 5 is clamped by the front cabinet 3 and the middle chassis 7.

A buffer material 16 is accommodated in the buffer material accommodating portion 74 and the end edge portion on the front surface of the light guide plate 10 abuts against the buffer material 16.

A lower surface of the abutting portion 75 abuts against an upper surface of an upper plate portion of the BL chassis 14 and an upper surface thereof abuts against a lower surface of an upper plate portion of the front cabinet 3. That is, the middle chassis 7 supports the upper plate portion of the BL chassis 14.

The display panel 5 and the backlight unit are integrated by the configuration described above.

In recent years, reduction of a frame size of the display module and thinning thereof have been attempted. In a case of a structure of reduction of the frame size, as illustrated in FIG. 12, an area of a portion of the middle chassis 7 which receives the display panel 5 is reduced. Therefore, a partial pressure is likely to be applied to the display panel 5 due to warping of the front cabinet 3, tolerances of components, and the like. That is, the panel supporting portion 72 is omitted in the fitting portion 76, the display panel 5 is not supported by the panel supporting portion 72, an end portion of the rib 80 on the fitting portion 76 side abuts against the display panel 5, and a load is applied. Therefore, there is a problem that a cell thickness (thickness of the liquid crystal layer) varies, a void occurs, and display quality is deteriorated. When a force acts in the direction of arrows illustrated in FIG. 12, in a case where the middle chassis 7 is opened, or in a case where the buffer material 15 is not provided up to the end portion of the fitting portion 76, the end portion of the rib 80 is likely to abut against the display panel 5.

In Japanese Unexamined Patent Application Publication No. 2013-164466, the invention of a TV receiver, which is configured such that the front cabinet clamps the display panel in portions except for four corner portions of the display panel and the four corner portions are not clamped by the front cabinet, is disclosed. According to the configuration, in a case where the front cabinet is mounted on the display panel, since a load is not applied to the four corner portions, it is possible to suppress occurrence of the void and to display an image with reduced unevenness.

SUMMARY

In a case of the TV receiver of Japanese Unexamined Patent Application Publication No. 2013-164466, since a gap exists between the front cabinet and the display panel in the four corner portions, there is a problem that light leakage can occur.

The disclosure is made in view of above circumstances and an object thereof is to provide a display apparatus in which light leakage does not occur, load application to a display panel on both end portion sides of a fitting portion of a panel supporting portion is suppressed, and occurrence of void and deterioration of display quality due to variation of a cell thickness of the display panel are suppressed, and a TV receiver including the display apparatus.

A display apparatus according to a first aspect of the present disclosure includes a display panel which forms a rectangular plate shape and displays an image on a front side; an optical sheet which forms a rectangular plate shape, is disposed on a rear side of the display panel, and has a plurality of position regulating portions protruding along a surface direction at an end edge portion; and a supporting body which forms a plate shape and supports an end edge portion of the optical sheet, wherein the supporting body is provided with a panel supporting portion which forms a plate shape, supports an end edge portion of the display panel, and has ribs on an inside end edge portion and a fitting portion for fitting the position regulating portion, in an outside end edge portion, wherein the ribs are cut out so that the end portions on fitting portion sides are gradually lowered in height toward the fitting portion.

A display apparatus according to a second aspect of the present disclosure includes a display panel which forms a rectangular plate shape and displays an image on a front side; an optical sheet which forms a rectangular plate shape, is disposed on a rear side of the display panel, and has a plurality of position regulating portions protruding along a surface direction at an end edge portion; and a supporting body which forms a plate shape and supports an end edge portion of the optical sheet, wherein the supporting body is provided with a panel supporting portion which forms a plate shape, supports an end edge portion of the display panel, and has ribs on an inside end edge portion and a fitting portion for fitting the position regulating portion, in an outside end edge portion, wherein end portions of the ribs on fitting portion sides are omitted.

A display apparatus according to a third aspect of the present disclosure includes a display panel which forms a rectangular plate shape and displays an image on a front side; an optical sheet which forms a rectangular plate shape, is disposed on a rear side of the display panel, and has a plurality of position regulating portions protruding along a surface direction at an end edge portion; and a supporting body which forms a plate shape and supports an end edge portion of the optical sheet, wherein the supporting body is provided with a panel supporting portion which forms a plate shape, supports an end edge portion of the display panel, and has ribs on an inside end edge portion and a fitting portion for fitting the position regulating portion, in an outside end edge portion, wherein the panel supporting portion is cut out so that an end portion on a fitting portion side is gradually lowered in height toward the fitting portion.

The display apparatus of the disclosure further includes a cabinet which covers an end edge portion of a front surface and a side surface of the display panel, wherein the supporting body has an abutting portion which abuts against a portion covering the side surface of the cabinet on an outside of the panel supporting portion, wherein a spacer is provided between the portion and the abutting portion.

A TV receiver of the disclosure includes the display apparatus according to any one of above description; and a reception unit which receives a television broadcast, wherein an image is displayed on the display apparatus based on the television broadcast received by the reception unit.

According to the display apparatus of the disclosure, the end portion of the fitting portion side of the rib is inclined toward a base portion of the supporting body, the end portion on the fitting portion side is omitted, or the end portion on the fitting portion side of the panel supporting portion is inclined on a base portion side of the supporting body. Therefore, even in a case where the display panel is released from the fitting portion of the supporting body, the end portion of the rib does not abut against the display panel. Therefore, a load is not applied to the display panel on both end portion sides of the fitting portion. Therefore, occurrence of void due to variation in a cell thickness of the display panel and deterioration of display quality are suppressed. Thus, since it is not configured not to apply a load to four corner portions as in Japanese Unexamined Patent Application Publication No. 2013-164466, light leakage does not occur.

The above and further objects and features will more fully be apparent from the following detailed description with accompanying drawings.

BRIEF DESCRIPTION OF THE DRAWINGS

FIG. 13 is a partial perspective view of a middle chassis of the related art.

DETAILED DESCRIPTION

Hereinafter, the disclosure will be described in detail based on the drawings illustrating embodiments thereof.

Embodiment 1

Figure 1:
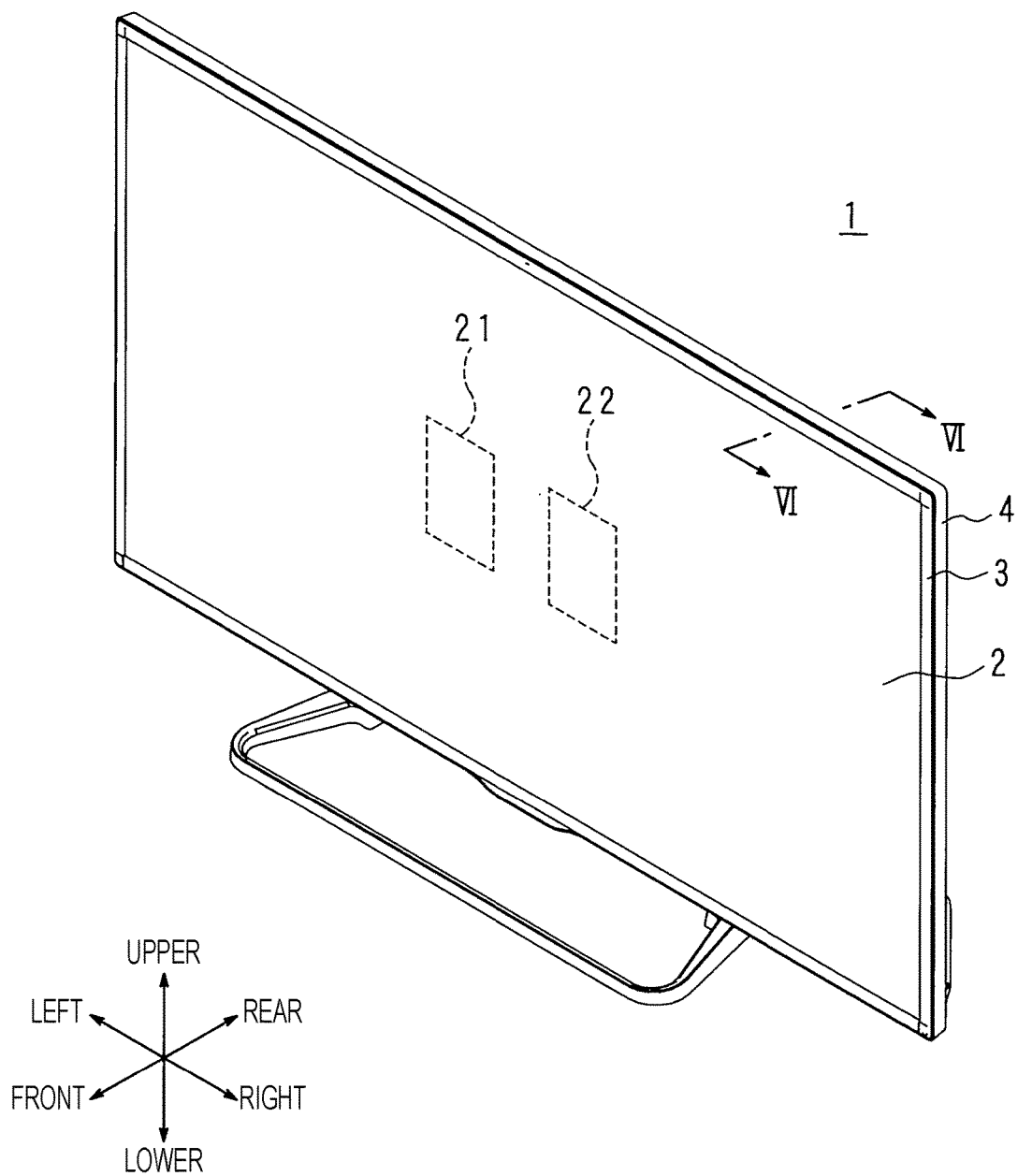
FIG. 1 is an external perspective view of a TV receiver according to Embodiment 1 of the disclosure.
Figure 2:
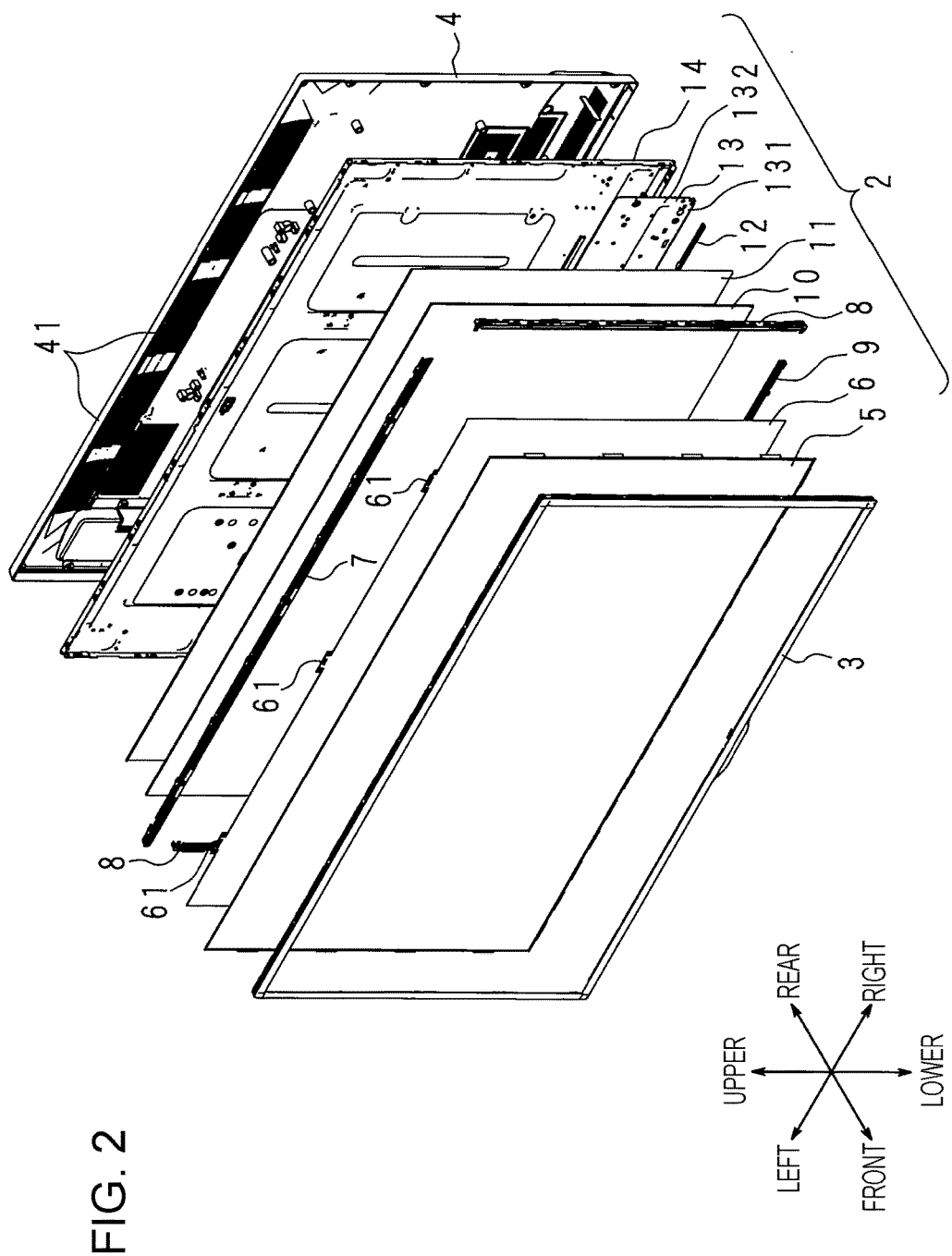
FIG. 2 is an exploded perspective view of the TV receiver.
Figure 3:
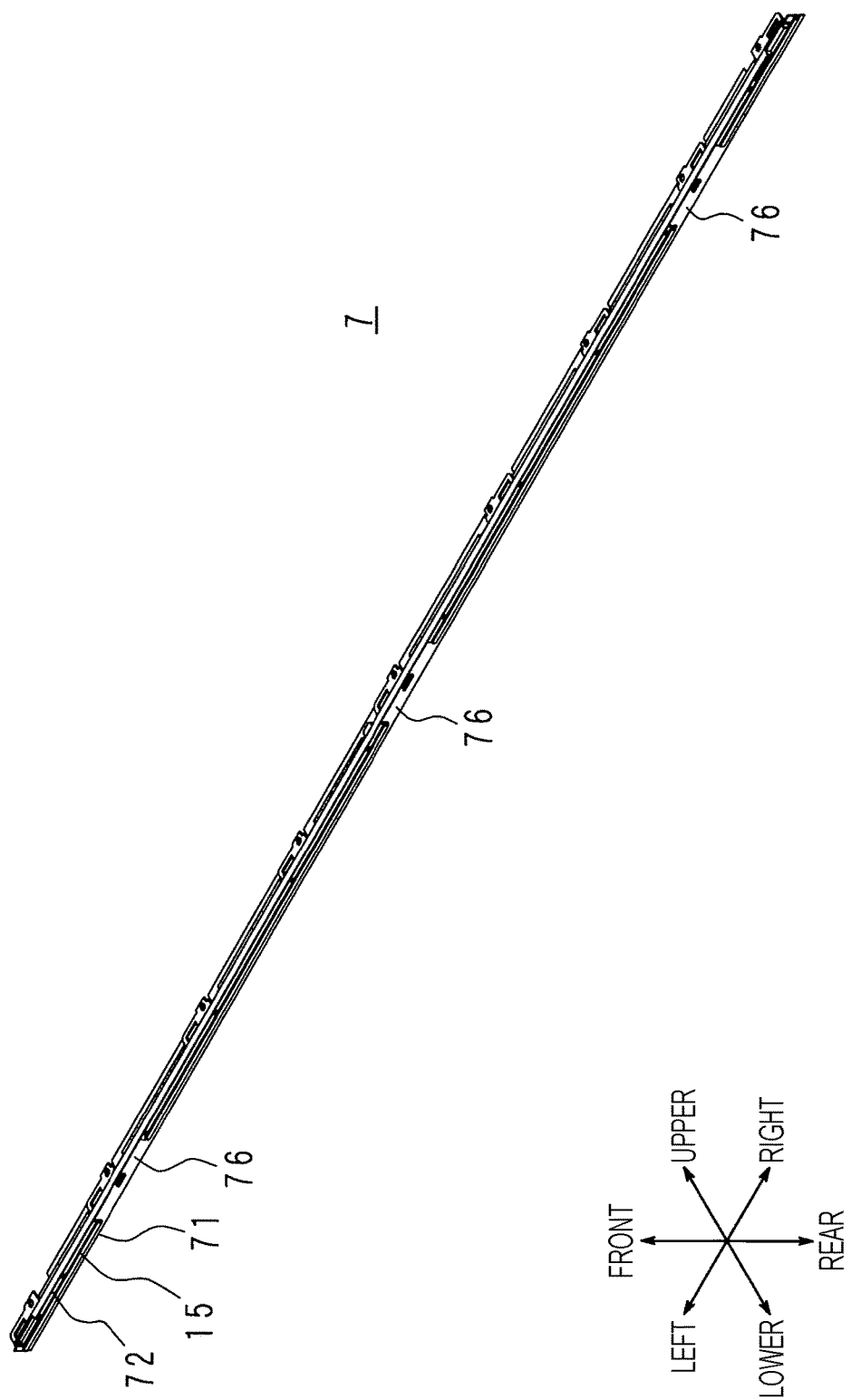
FIG. 3 is a perspective view of a middle chassis.
Figure 4:
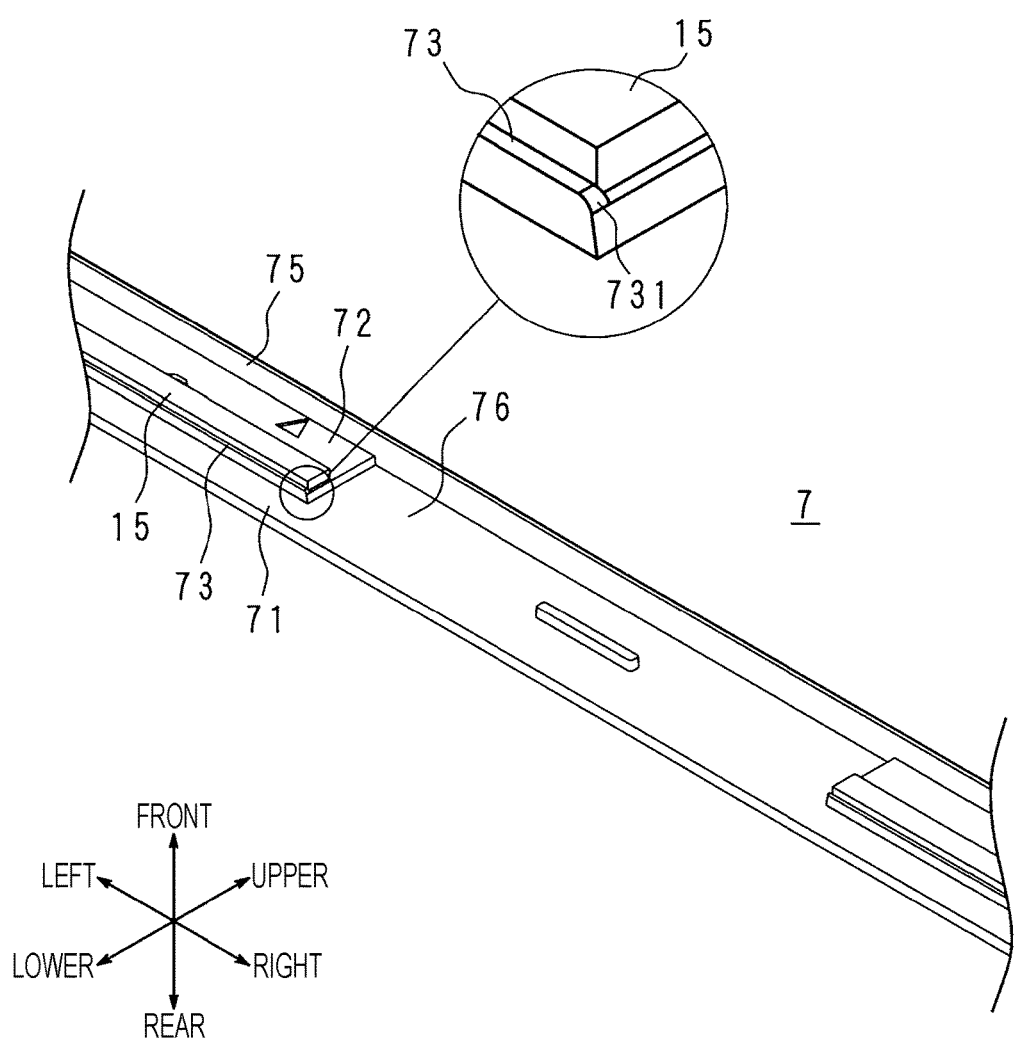
FIG. 4 is an enlarged perspective view of a part of the middle chassis.
Figure 5:
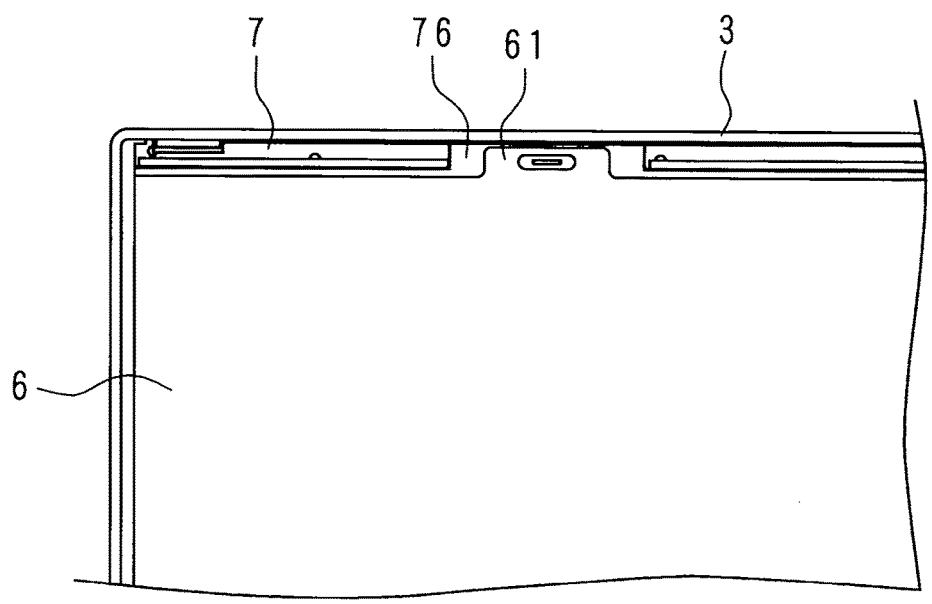
FIG. 5 is a partial front view illustrating a state where a position regulating portion of an optical sheet is fitted to a fitting portion of the middle chassis.
Figure 5:
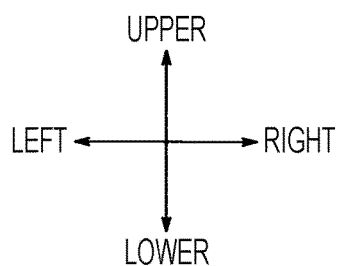
Figure 6:
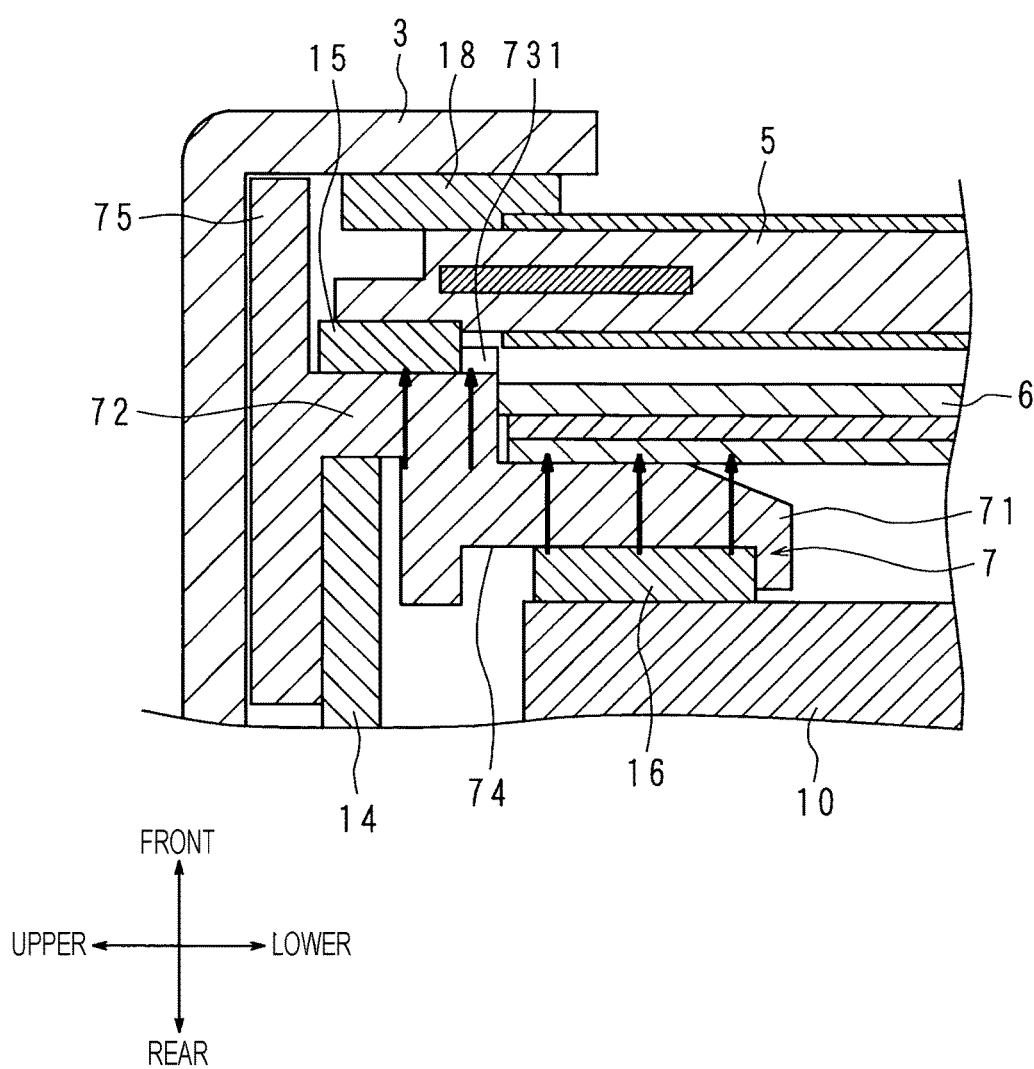
FIG. 6 is a sectional view that is taken along line VI-VI of FIG. 1.

FIG. 1 is an external perspective view of a TV receiver according to Embodiment 1 of the disclosure. FIG. 2 is an exploded perspective view of the TV receiver. FIG. 3 is a perspective view of a middle chassis 7. FIG. 4 is an enlarged perspective view of a part of the middle chassis 7. FIG. 5 is a partial front view illustrating a state where a position regulating portion 61 of an optical sheet 6 is fitted to a fitting portion 76 of the middle chassis 7. FIG. 6 is a sectional view that is taken along line VI-VI of FIG. 1. In the following description, upper, lower, left, right, front, and rear indicated by arrows in each drawing are used.

A TV receiver 1 includes a display module 2 having a display panel 5, a front cabinet 3 and a rear cabinet 4 that are made of synthetic resin and sandwich the display module 2 to be housed, a tuner 21 that receives an encoded broadcast wave from an antenna (not illustrated), and a decoder 22 that decodes the encoded broadcast wave. The display module 2 forms a substantially rectangular parallelepiped shape which is horizontally long as a whole and is housed between the front cabinet 3 and the rear cabinet 4 in a vertical posture.

As illustrated in FIG. 2, the front cabinet 3 forms a rectangular frame shape.

The rear cabinet 4 forms a box shape so as to cover a side surface and a rear surface of the display module 2. The rear cabinet 4 is provided with a plurality of radiation slits 41.

The display module 2 includes the display panel 5, an optical sheet 6, middle chassis 7, 8, 8, and 9, a light guide plate 10, a reflection sheet 11, an LED substrate 12, a heat spreader 13, and a BL chassis 14.

When performing a display operation, planar light is emitted from the light guide plate 10 and the rear surface of the display panel 5 is illuminated by the light.

The BL chassis 14 forms a substantially box shape opened to the display panel 5 side. Therefore, the light guide plate 10, the reflection sheet 11, the LED substrate 12, and the heat spreader 13 are accommodated in the BL chassis 14.

A main substrate (not illustrated) including the tuner 21, the decoder 22, a CPU, and the like is provided on a rear surface of the BL chassis 14.

The display panel 5 has a color filter substrate, a liquid crystal layer, a TFT substrate, and two polarizers. The color filter substrate and the TFT substrate are adhered to each other with a sealing material and the liquid crystal layer is injected therebetween. Therefore, the two polarizers are disposed on a surface of each of the color filter substrate and the TFT substrate opposite to the liquid crystal layer side.

The light guide plate 10 forms a rectangular plate shape and has a main surface facing the display panel 5 side, a rear surface facing the BL chassis 14 on a surface opposite to the main surface, a pair of long side surfaces, and a pair of short side surfaces. The long side surface on a lower side functions as a light incident surface for introducing light into the light guide plate 10 and light introduced from the long side surface into the light guide plate 10 is emitted from the main surface of the light guide plate 10 toward the display panel 5 side.

The optical sheet 6 is a sheet group including a diffusion sheet, a lens sheet, a DBEF sheet (reflective polarizing sheet), and the like, and is disposed on the main surface side of the light guide plate 10. Therefore, diffusion and condensation of light emitted from the main surface of the light guide plate 10, and the like are performed by the optical sheet 6.

Three position regulating portions 61 protruding along a surface direction are provided in an end edge portion on an upper side of the optical sheet 6.

The LED substrate 12 is provided to generate light introducing into the light guide plate 10 and is disposed on the long side surface side of the light guide plate 10. A plurality of LEDs are mounted on a plane of a substrate body of the LED substrate 12. The LED substrate 12 extends along the long side surface of the light guide plate 10 and the plurality of LEDs are disposed so as to face the long side surface of the light guide plate 10.

The heat spreader 13 includes an LED attachment portion 131 to which the LED substrate 12 is attached and an abutting portion 132 that abuts against an inner surface of a bottom plate of the BL chassis 14. The LED attachment portion 131 and the abutting portion 132 form an L-shape in a side surface view.

The reflection sheet 11 is disposed on the rear surface of the light guide plate 10.

As illustrated in FIGS. 3, 4, and 6, the middle chassis 7 includes a body 71, a panel supporting portion 72, a rib 73, a buffer material accommodating portion 74, and an abutting portion 75. The body 71 forms a plate shape and the panel supporting portion 72, which forms a plate shape and extends in a longitudinal direction of the body 71, is provided in an upper end edge portion (outside end edge portion) of the body 71.

The rib 73, which extends in the longitudinal direction of the panel supporting portion 72, is provided in a lower end edge portion (inside end edge portion) of the panel supporting portion 72.

The panel supporting portion 72 is cut out at three locations in the longitudinal direction corresponding to the position regulating portion 61 and a fitting portion 76 is provided. Therefore, the rib 73 has a cut-out portion 731 that is cut out so that an end portion on the fitting portion 76 side is gradually lowered in height toward the fitting portion 76. As illustrated in FIG. 4, the cut-out portion 731 may be a curved shape, or may be a linear shape. The curved shape is preferable because a load is unlikely to apply to the display panel 5.

The abutting portion 75 is vertically connected to the panel supporting portion 72 on an upper end surface of the panel supporting portion 72. The buffer material accommodating portion 74 is recessed on a rear surface of the body 71.

The middle chassis 8 and 9 has the same configuration as hat of the middle chassis 7 except not having a fitting portion.

In the middle chassis 7 configured as described above, in a state where the position regulating portion 61 is fitted to the fitting portion 76 of the panel supporting portion 72, the end edge portion of the optical sheet 6 is supported on the plane of the body 71. Therefore, in a state where a buffer material 15 is mounted between the rib 73 and the abutting portion 75, the end edge portion on the rear surface of the display panel 5 is supported by the panel supporting portion 72. A buffer material 16 is accommodated in the buffer material accommodating portion 74 and the end edge portion on the front surface of the light guide plate 10 abuts against the buffer material 16.

That is, in a state where a buffer material 18 is interposed between the end edge portion on the front surface of the display panel 5 and the front cabinet 3, and the buffer material 15 is interposed between the end edge portion on the rear surface of the display panel 5 and the panel supporting portion 72, the display panel 5 is clamped by the front cabinet 3 and the middle chassis 7.

In the abutting portion 75, a lower surface abuts against an upper surface of an upper plate portion of the BL chassis 14 and an upper surface abuts against a lower surface of the upper plate portion of the front cabinet 3. That is, the middle chassis 7 supports the upper plate portion of the BL chassis 14.

The display panel 5 and the backlight unit are integrated by the configuration described above.

The display module 2 of the embodiment is configured as described above. Therefore, when assembling the display module 2, even in a case where a force acts on a direction in which the middle chassis 7 illustrated in FIG. 6 is opened, the rib 73 has the cut-out portion 731. Thus, the end portion of the rib 73 on the fitting portion 76 side does not abut against the display panel 5. That is, loads does not apply to the display panel 5 on both end sides of the fitting portion 76. Therefore, occurrence of void and deterioration of display quality of the TV receiver 1 due to variation of a cell thickness of the display panel 5 are suppressed.

Embodiment 2

Figure 7:
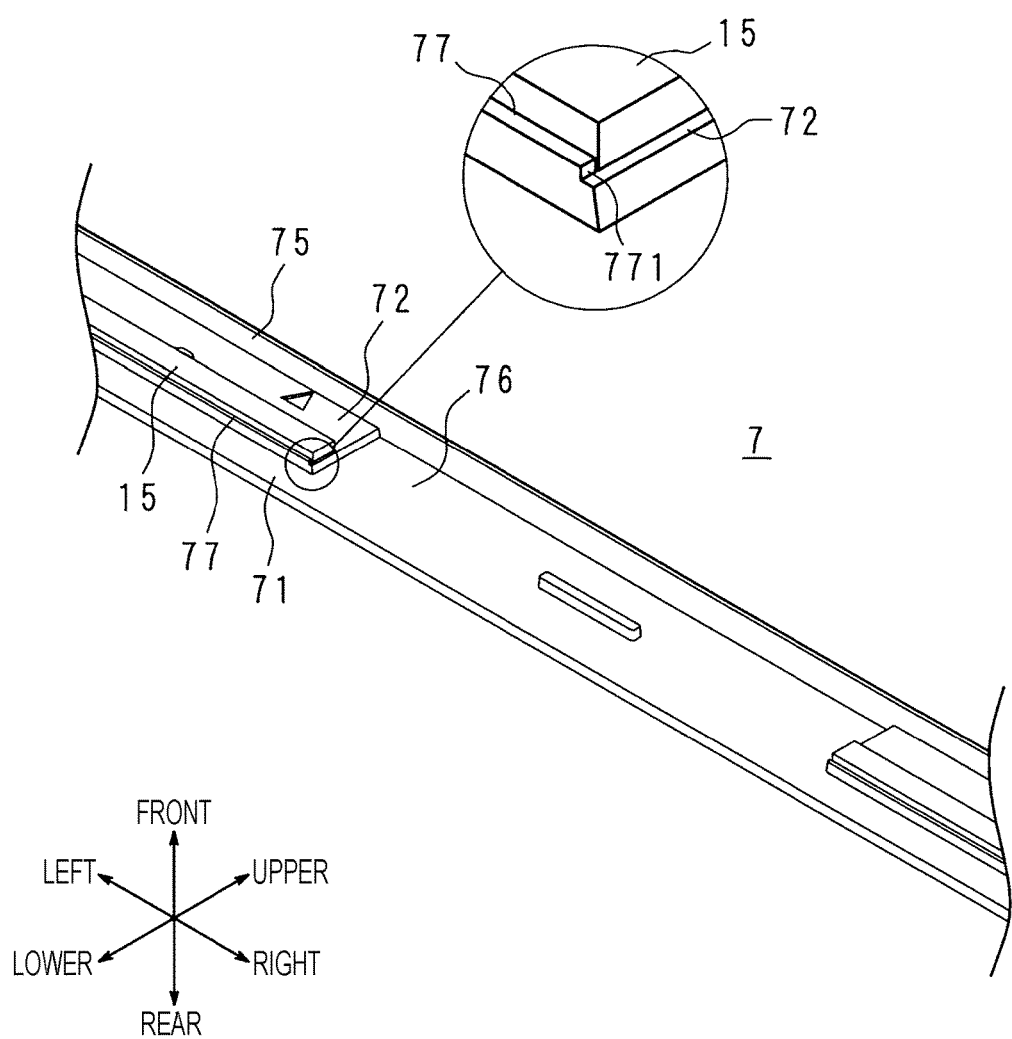
FIG. 7 is a partial perspective view illustrating a middle chassis of a TV receiver according to Embodiment 2 of the disclosure.

FIG. 7 is a partial perspective view illustrating a middle chassis 7 of a TV receiver according to Embodiment 2 of the disclosure. In the drawing, the same reference numerals are given to the same portions as those in FIG. 4 and detailed description will be omitted.

In the middle chassis 7 according to the embodiment, a rib 77 that is provided in an end edge portion on a lower side on a panel supporting portion 72 has a omitted portion 771 that is omitted on an end portion side of a fitting portion 76.

The middle chassis 7 of the embodiment is configured as described above. Therefore, when assembling a display module 2, even in a case where a force acts in a direction in which the middle chassis 7 is opened, the rib 77 has the omitted portion 771. Therefore, an end portion of the rib 77 on the fitting portion 76 side does not abut against a display panel 5. That is, no load is applied to the display panel 5 on both end sides of the fitting portion 76. Therefore, occurrence of void and deterioration of display quality of the TV receiver 1 due to the variation of the cell thickness of the display panel 5 are preferably suppressed. Moreover, the end surface of the rib 77 on the omitted portion 771 side may be formed in an R shape.

Embodiment 3

Figure 8:
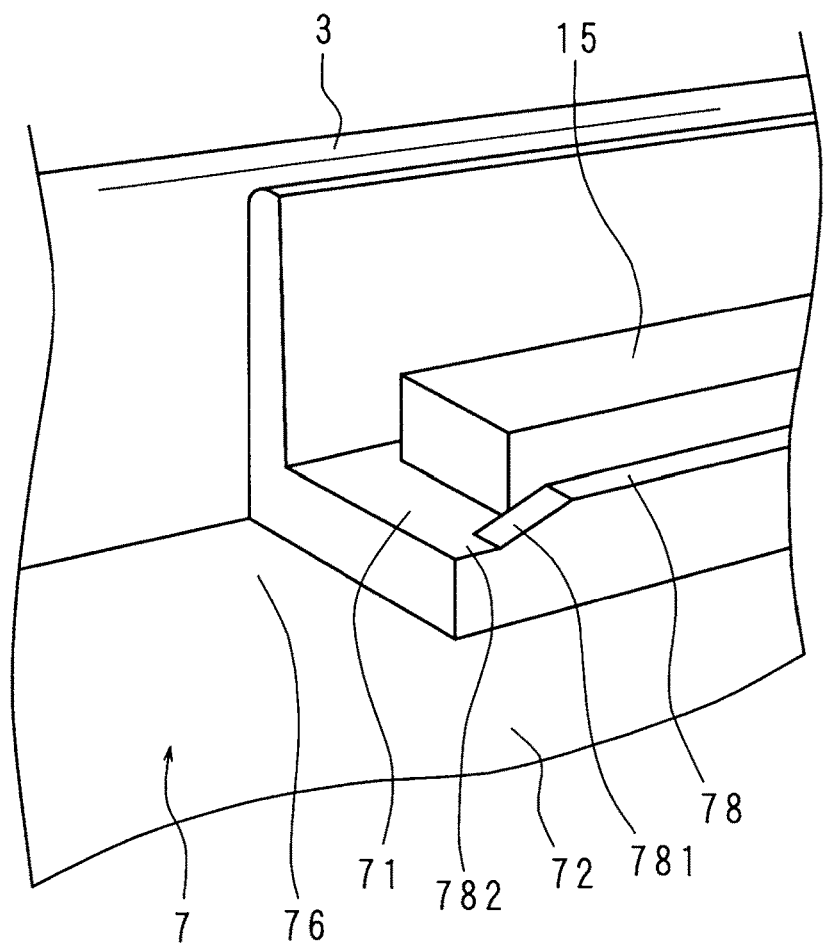
FIG. 8 is a partial perspective view illustrating a middle chassis of a TV receiver according to Embodiment 3 of the disclosure.
Figure 8:
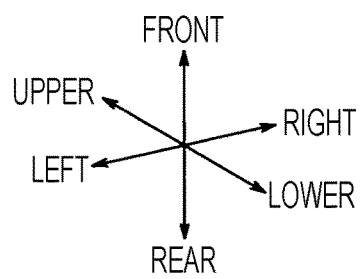

FIG. 8 is a partial perspective view illustrating a middle chassis 7 of a TV receiver according to Embodiment 3 of the disclosure. In the drawing, the same reference numerals are given to the same portions as those in FIG. 4 and detailed description will be omitted. In FIG. 8, a portion for covering an end edge portion of a display panel 5 of a front cabinet 3 is omitted.

The middle chassis 7 according to the embodiment has a omitted portion 782 in which a rib 78 provided in an end edge portion on a lower side on a panel supporting portion 72 is omitted on an end portion side of a fitting portion 76, and an inclined portion 781 connected to the omitted portion 782.

The middle chassis 7 of the embodiment is configured as described above. Therefore, when assembling a display module 2, even in a case where a force acts on a direction in which the middle chassis 7 is opened, the rib 78 has the omitted portion 782 and the inclined portion 781. Thus, an end portion of the rib 78 on a fitting portion 76 side does not abut against a display panel 5. That is, no load is applied to the display panel 5 on both end sides of the fitting portion 76. Therefore, it is not necessary to provide a buffer material 15 up to the end portion of the fitting portion 76 and to absorb a load applied to the display panel 5. In the embodiment, occurrence of void and deterioration of display quality of the TV receiver 1 due to variation of a cell thickness of the display panel 5 are preferably suppressed.

Moreover, the end portion of the inclined portion 781 may be formed in an R shape.

Embodiment 4

Figure 9:
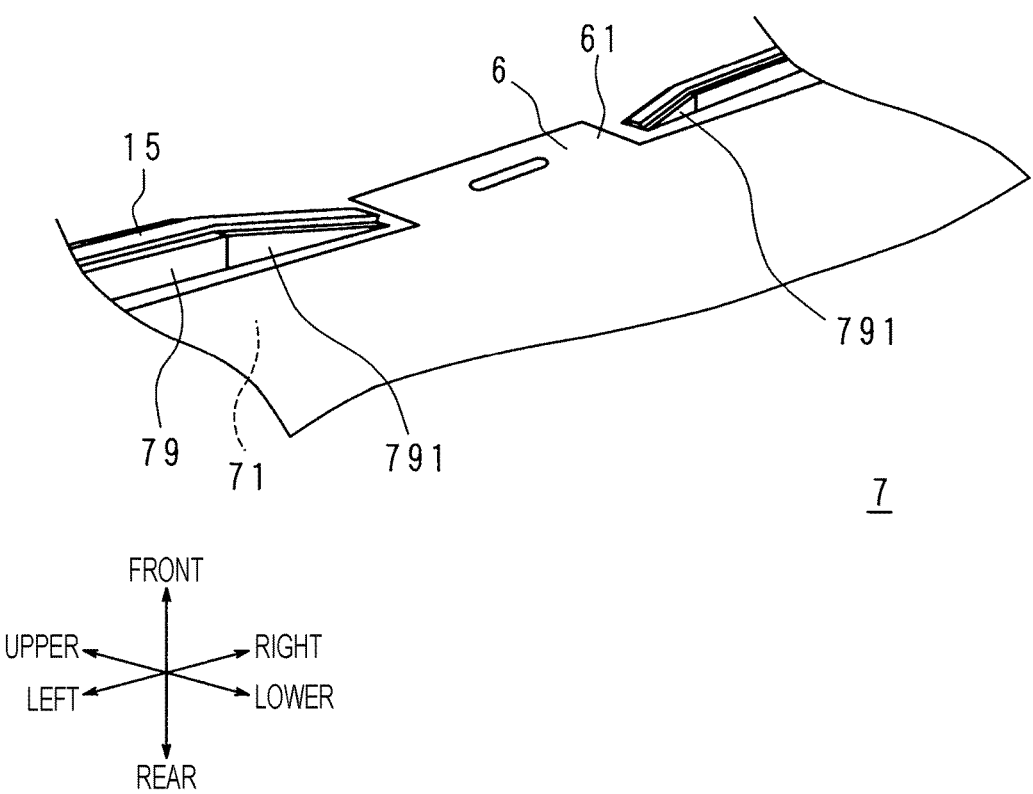
FIG. 9 is a partial perspective view illustrating a middle chassis of a TV receiver according to Embodiment 4 of the disclosure.

FIG. 9 is a partial perspective view illustrating a middle chassis 7 of a TV receiver according to Embodiment 4 of the disclosure. In the drawing, the same reference numerals are given to the same portions as those in FIG. 4 and detailed description will be omitted.

The middle chassis 7 according to the embodiment has an inclined portion 791 in which an end portion of a panel supporting portion 79 on a fitting portion 76 is inclined on a body 71 side.

The middle chassis 7 of the embodiment is configured as described above. Therefore, when assembling a display module 2, even in a case where a force acts in a direction in which the middle chassis 7 is opened, a panel supporting portion 79 has the inclined portion 791. Thus, in a case where a pressure is applied to a portion of the display panel 5 on a fitting portion 76 side, the pressure is absorbed. Therefore, occurrence of void and deterioration of display quality of the TV receiver 1 due to variation of a cell thickness of the display panel 5 are preferably suppressed.

Moreover, an end portion of the inclined portion 791 may be an R shape.

Embodiment 5

Figure 10:
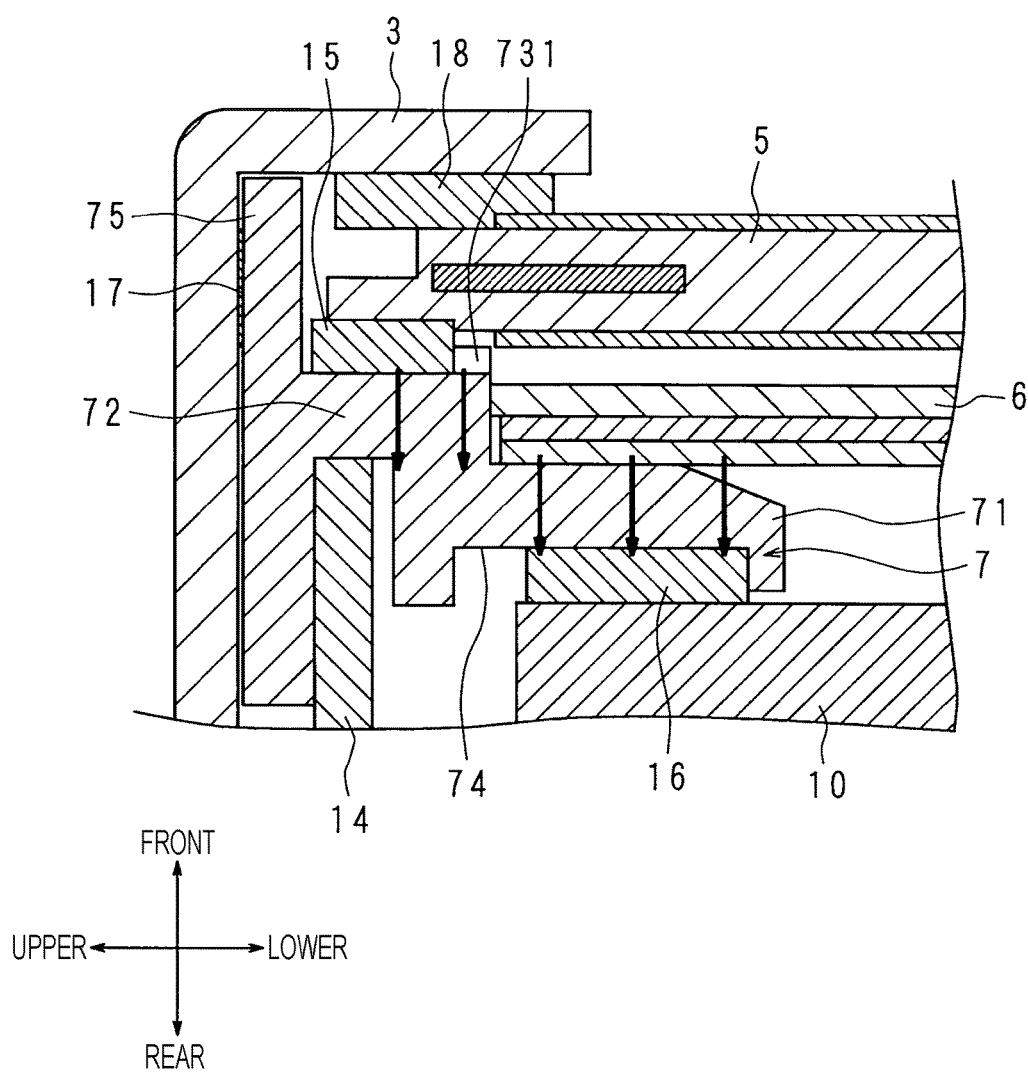
FIG. 10 is a partial sectional view illustrating a state where a display module of a TV receiver according to Embodiment 5 of the disclosure is covered by a front cabinet.

FIG. 10 is a partial sectional view illustrating a state where a display module 2 of a TV receiver according to Embodiment 5 of the disclosure is covered by a front cabinet 3. In the drawing, the same reference numerals are given to the same portions as those in FIG. 6 and detailed description will be omitted. That is, the middle chassis 7 according to the embodiment has a cut-out portion 731.

In the embodiment, a spacer 17 is provided between an upper surface of an abutting portion 75 and a lower surface of an upper plate portion of a front cabinet 3.

The TV receiver according to the embodiment has the spacer 17. Therefore, a force acts in the direction of arrows indicated in FIG. 10, that is, in a direction in which the middle chassis 7 is pressed to a light guide plate 10 side and opening of the middle chassis 7 is suppressed. Therefore, the middle chassis 7 has a cut-out portion 731 and thereby abutting of a rib 73 against a display panel 5 is further preferably suppressed.

Embodiment 6

Figure 11:
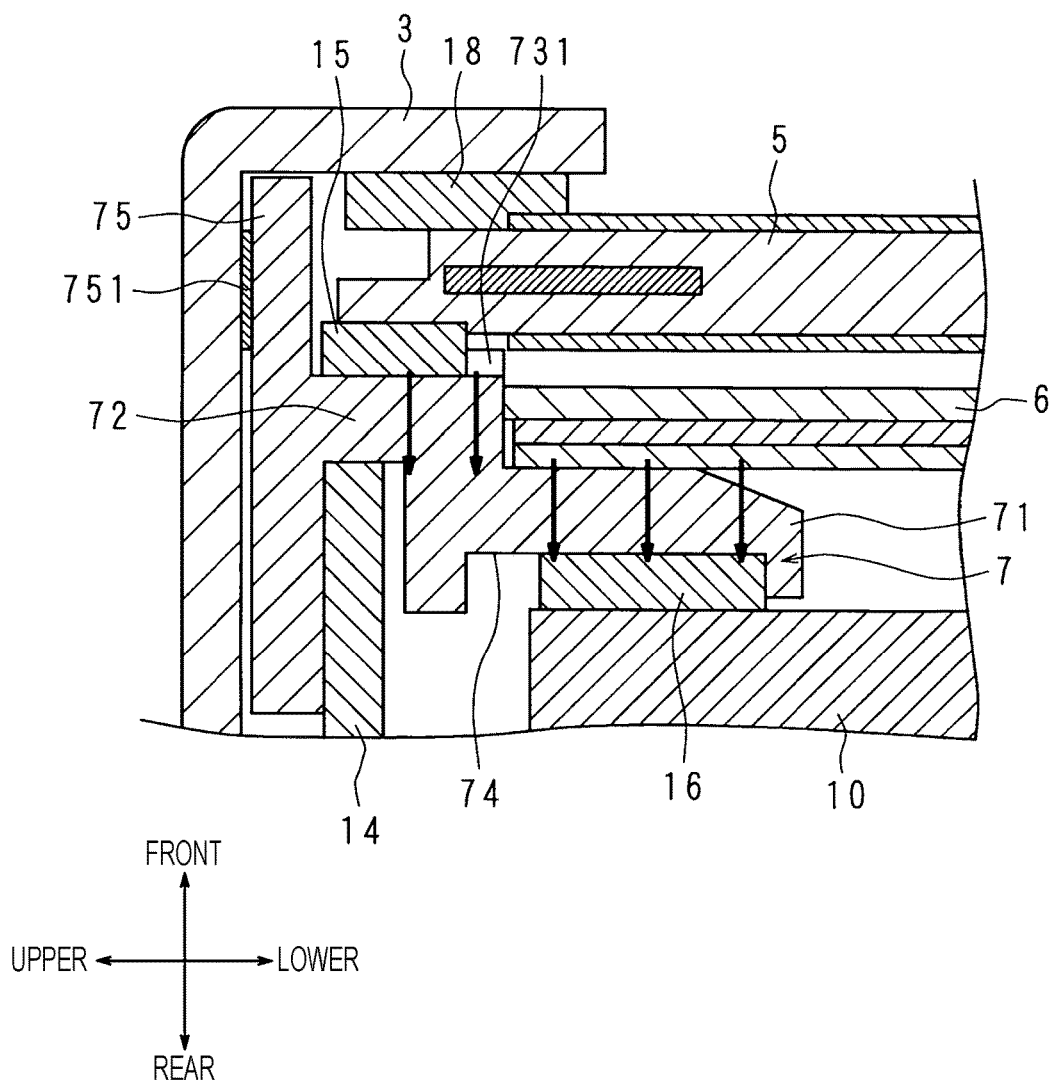
FIG. 11 is a partial sectional view illustrating a state where a display module of a TV receiver according to Embodiment 6 of the disclosure is covered by a front cabinet.
Figure 12:
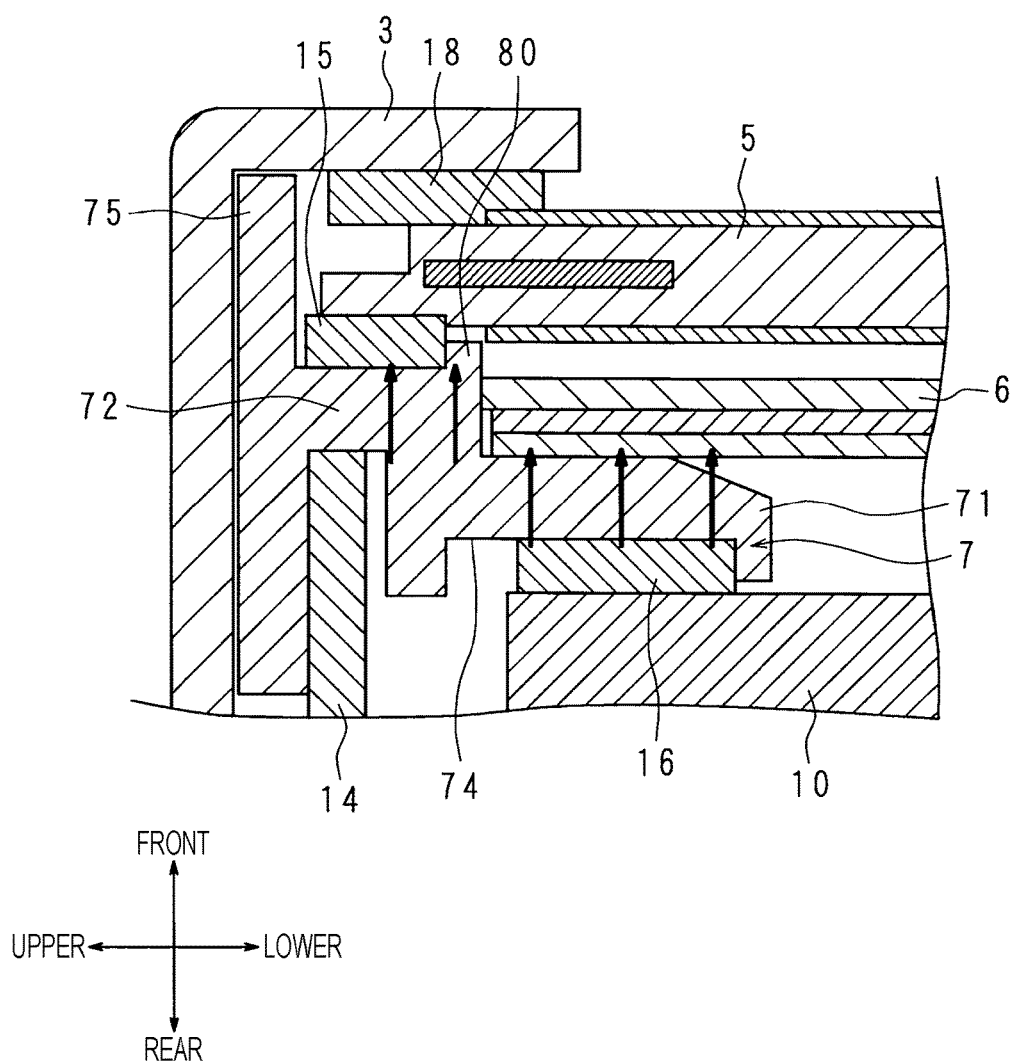
FIG. 12 is a partial sectional view of a display module of the related art.

FIG. 11 is a partial sectional view illustrating a state where a display module 2 of a TV receiver according to Embodiment 6 of the disclosure is covered by a front cabinet 3. In the drawing, the same reference numerals are given to the same portions as those in FIG. 6 and detailed description will be omitted. That is, the middle chassis 7 according to the embodiment has a cut-out portion 731.

In the embodiment, a protruding portion 751 protruding on an upper plate side of a front cabinet 3 is provided on an upper surface of an abutting portion 75.

The TV receiver according to the embodiment has the protruding portion 751. Therefore, a pressing force acts in arrow directions indicated in FIG. 11, that is, in a direction in which the middle chassis 7 is pressed to a light guide plate 10 side and opening of the middle chassis 7 is suppressed. Therefore, the middle chassis 7 has a cut-out portion 731 and thereby abutting of a rib 73 against a display panel 5 is further preferably suppressed.

As described above, the display apparatus (1) according to the disclosure includes the display panel (5) which forms the rectangular plate shape and displays an image on the front side; the optical sheet (6) which forms a rectangular plate shape, is disposed on the rear side of the display panel, and has the plurality of position regulating portions (61) protruding along the surface direction in the end edge portion; and the supporting body (7) which forms a plate shape, supports the end edge portion of the optical sheet, wherein the supporting body is provided with the panel supporting portion (72) which forms a plate shape, supports an end edge portion of the display panel, and has the ribs (73 and 78) on an inside end edge portion and the fitting portion (76) for fitting the position regulating portion, in an outside end edge portion. The ribs are cut out so that the end portions on the fitting portion sides are gradually lowered in height toward the fitting portion.

According to the disclosure, the end portions of the ribs on the fitting portion side are inclined toward the base portion (body) of the supporting body. Therefore, even in a case where the display panel falls down in the fitting portion of the supporting body, the end portions of the ribs do not come into contact with the display panel. Therefore, a load does not apply to the display panel on the both end sides of the fitting portion. Thus, occurrence of void and deterioration of display quality due to variation of the cell thickness of the display panel are suppressed.

The display apparatus (1) according to the disclosure includes the display panel (5) which forms a rectangular plate shape and displays an image on the front side; the optical sheet (6) which forms a rectangular plate shape, is disposed on the rear side of the display panel, and has the plurality of position regulating portions (61) protruding along the surface direction in the end edge portion; and the supporting body (7) which forms a plate shape, supports the end edge portion of the optical sheet, wherein the supporting body is provided with the panel supporting portion (72) which forms a plate shape, supports an end edge portion of the display panel, and has the ribs (77 and 78) on an inside end edge portion and the fitting portion (76) for fitting the position regulating portion, in an outside end edge portion. In the ribs, the end portions on the fitting portions side are omitted.

According to the disclosure, the end portions of the ribs on the fitting portion sides are omitted. Therefore, even in a case where the display panel falls down in the fitting portion of the supporting body, the end portions of the ribs do not abut against the display panel. That is, a load does not apply to the display panel on the both end sides of the fitting portion. Thus, occurrence of void and deterioration of display quality due to variation of the cell thickness of the display panel are suppressed.

The display apparatus (1) according to the disclosure includes the display panel (5) which forms a rectangular plate shape and displays an image on the front side; the optical sheet (6) which forms a rectangular plate shape, is disposed on the rear side of the display panel, and has the plurality of position regulating portions (61) protruding along the surface direction in the end edge portion; and the supporting body (7) which forms a plate shape, supports the end edge portion of the optical sheet, wherein the supporting body is provided with the panel supporting portion (79) which forms a plate shape, supports an end edge portion of the display panel, and has the ribs on an inside end edge portion and the fitting portion (76) for fitting the position regulating portion, in an outside end edge portion. The panel supporting portion is cut out so that the end portion on the fitting portion side is gradually lowered in height toward the fitting portion.

According to the disclosure, the end portion of the panel supporting portion on the fitting portion side is inclined toward the base portion (body) side of the supporting body. Therefore, even in a case where the display panel falls down in the fitting portion of the supporting body, the end portions of the ribs do not abut against the display panel. Therefore, a load does not apply to the display panel on the both end sides of the fitting portion. Thus, occurrence of void and deterioration of display quality due to variation of the cell thickness of the display panel are suppressed.

The display apparatus (1) according to the disclosure further includes the cabinet (3) which covers the end edge portion of the front surface and the side surface of the display panel. The supporting body has the abutting portion (75) which abuts against the portion covering the side surface of the cabinet on the outside of the panel supporting portion. The spacer (17) is provided between the portion and the abutting portion.

According to the disclosure, opening of the supporting body on the cabinet side is suppressed and abutting of the rib against the display panel is further suppressed.

The display apparatus (1) according to the disclosure has the cabinet (3) which covers the end edge portion of the front surface and the side surface of the display panel. The supporting body has the abutting portion (75) which abuts against the portion covering the side surface of the cabinet on the outside of the panel supporting portion. The abutting portion has the protruding portion (751) protruding to the portion side.

According to the disclosure, opening of the supporting body on the cabinet side is suppressed and abutting of the rib against the display panel is further suppressed.

The TV receiver (1) according to the disclosure includes the display apparatus according to any one of above descriptions; and the reception unit (21) which receives a television broadcast. An image is displayed on the display apparatus based on the television broadcast received by the reception unit.

According to the disclosure, the void does not occur and display quality is good.

The invention is not limited to the contents of the embodiments described above and various modifications are possible within the scope indicated in the claims. That is, embodiments obtained by combining technical means appropriately changed within the scope of the claims are also included in the technical scope of the invention.

It is to be noted that, as used herein and in the appended claims, the singular forms "a", "an", and "the" include plural referents unless the context clearly dictates otherwise.

The invention claimed is:
1. A display apparatus comprising:
a display panel which has a rectangular plate shape and displays an image on a front side;
an optical sheet which has a rectangular plate shape, is disposed on a rear side of the display panel, and has a plurality of position regulating portions protruding at an end edge portion; and
a supporting body which has a plate shape and supports the end edge portion of the optical sheet, wherein the supporting body is provided with a panel supporting portion in an outside end edge portion, the panel supporting portion has a plate shape, supports an end edge portion of the display panel, and has a rib on an inside end edge portion and a fitting portion that fits one position regulating portion, and the rib has a cut-out portion in which a portion of the rib that corresponds to an end of the fitting portion is cut out so that a height of the rib decreases toward the fitting portion.

2. The display apparatus according to claim 1, further comprising:
a cabinet which covers an end edge portion of a front surface and a side surface of the display panel, wherein
the supporting body has an abutting portion which abuts against a portion of the cabinet which covers the side surface of the display, on an outside of the panel supporting portion,
a spacer is provided between the portion and the abutting portion.

3. The display apparatus according to claim 1, further comprising:
a cabinet which covers an end edge portion of a front surface and a side surface of the display panel, wherein
the supporting body has an abutting portion which abuts against a portion of the cabinet which covers the side surface of the display, on an outside of the panel supporting portion,
the abutting portion has the protruding portion protruding to the portion side.

4. A television receiver comprising:
the display apparatus according to claim 1; and
a reception unit which receives a television broadcast, wherein an image is displayed on the display apparatus based on the television broadcast received by the reception unit.

5. A display apparatus comprising:
a display panel which has a rectangular plate shape and displays an image on a front side;
an optical sheet which has a rectangular plate shape, is disposed on a rear side of the display panel, and has a plurality of position regulating portions protruding at an end edge portion; and
a supporting body which has a plate shape and supports the end edge portion of the optical sheet, wherein
the supporting body is provided with a panel supporting portion in an outside end edge portion,
the panel supporting portion has a plate shape, supports an end edge portion of the display panel, and has a rib on an inside end edge portion and a fitting portion that fits one position regulating portion, and
the rib has an omitted portion in which a portion of the rib that corresponds to an end of fitting portion is omitted so that the rib does not abut against the display panel.

6. A display apparatus comprising:
a display panel which has a rectangular plate shape and displays an image on a front side;
an optical sheet which has a rectangular plate shape, is disposed on a rear side of the display panel, and has a plurality of position regulating portions protruding at an end edge portion; and
a supporting body which has a plate shape and supports the end edge portion of the optical sheet, wherein
the supporting body is provided with a panel supporting portion in an outside end edge portion,
the panel supporting portion has a plate shape, supports an end edge portion of the display panel, and has a rib on an inside end edge portion and a fitting portion that fits one position regulating portion, and
the panel supporting portion has an inclined portion in which a portion of the panel supporting portion that corresponds to an end portion of the fitting portion is inclined toward the fitting portion.

* * * * *